(12) United States Patent
Dube et al.

(10) Patent No.: US 11,125,093 B2
(45) Date of Patent: Sep. 21, 2021

(54) VANE WITH L-SHAPED SEAL

(71) Applicant: United Technologies Corporation, Farmington, CT (US)

(72) Inventors: Bryan P. Dube, Columbia, CT (US); Michael G. McCaffrey, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 3 days.

(21) Appl. No.: 16/659,737

(22) Filed: Oct. 22, 2019

(65) Prior Publication Data

US 2021/0115804 A1  Apr. 22, 2021

(51) Int. Cl.
*F01D 11/00* (2006.01)

(52) U.S. Cl.
CPC ........ *F01D 11/001* (2013.01); *F05D 2240/12* (2013.01); *F05D 2240/55* (2013.01)

(58) Field of Classification Search
CPC ............... F01D 11/001; F05D 2240/12; F05D 2240/55; F05D 2240/11
See application file for complete search history.

(56) References Cited

U.S. PATENT DOCUMENTS

| | | | | |
|---|---|---|---|---|
| 4,875,830 A * | 10/1989 | Trousdell | ............. | F01D 5/3038 416/215 |
| 5,709,530 A * | 1/1998 | Cahill | ................... | F01D 11/005 277/644 |
| 6,612,809 B2 * | 9/2003 | Czachor | ................ | F01D 11/005 415/189 |
| 7,600,970 B2 | 10/2009 | Bhate et al. | | |
| 10,233,764 B2 | 3/2019 | Thomas et al. | | |
| 10,684,149 B2 * | 6/2020 | Koenig | ..................... | F02C 7/18 |
| 10,774,665 B2 * | 9/2020 | Greene | ................ | F01D 11/005 |
| 2008/0279679 A1 | 11/2008 | Morrison | | |
| 2015/0125301 A1 * | 5/2015 | Headland | .............. | F01D 11/006 416/174 |
| 2018/0106158 A1 * | 4/2018 | Boeke | ..................... | F01D 9/041 |
| 2018/0328208 A1 | 11/2018 | O'Leary et al. | | |
| 2020/0040750 A1 * | 2/2020 | Greene | ................. | F01D 11/005 |

FOREIGN PATENT DOCUMENTS

| | | |
|---|---|---|
| EP | 3085901 | 10/2016 |
| EP | 3214276 | 9/2017 |

OTHER PUBLICATIONS

European Search Report for European Patent Application No. 20202568.0 completed Jan. 13, 2021.

* cited by examiner

*Primary Examiner* — Jesse S Bogue
(74) *Attorney, Agent, or Firm* — Carlson, Gaskey & Olds, P.C.

(57) ABSTRACT

A vane includes a ceramic vane piece that defines first and second vane platforms and a hollow airfoil section that joins the first and second vane platforms. A structural platform adjacent the first platform defines a radial seal slot. A seal has a radial leg and an axial leg. The radial leg extends in the radial seal slot and the axial leg extends in an interface between the structural platform and the first vane platform.

17 Claims, 3 Drawing Sheets

VANE WITH L-SHAPED SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A vane according to an example of the present disclosure includes a ceramic vane piece that defines first and second vane platforms and a hollow airfoil section that joins the first and second vane platforms. There is a structural platform adjacent the first platform. The structural platform defines a radial seal slot. A seal has a radial leg and an axial leg. The radial leg extends in the radial seal slot and the axial leg extends in an interface between the structural platform and the first vane platform.

A further embodiment of any of the foregoing embodiments includes a pressure tap that opens to the seal.

In a further embodiment of any of the foregoing embodiments, the axial leg defines an axial length, the radial leg defines a radial length, and the axial length is greater than the radial length.

In a further embodiment of any of the foregoing embodiments, the seal includes a filet that joins the radial leg and the axial leg such that the seal has an L-shaped cross-section.

In a further embodiment of any of the foregoing embodiments, the radial leg extends from the filet to a tip edge, and the tip edge has a concavity.

In a further embodiment of any of the foregoing embodiments, the structural platform defines a purge hole that opens at the radial seal slot and exits over the concavity.

In a further embodiment of any of the foregoing embodiments, the radial leg and the axial leg are arced.

In a further embodiment of any of the foregoing embodiments, the seal is formed of a metallic material and has a thickness of 0.15 millimeters to 0.28 millimeters.

In a further embodiment of any of the foregoing embodiments, the structural platform further comprises an axial seal slot extending from the radial seal slot.

In a further embodiment of any of the foregoing embodiments, the radial leg and the axial leg form an angle of 60° to 105°.

A vane according to an example of the present disclosure includes a ceramic vane piece that defines first and second vane platforms and a hollow airfoil section that joins the first and second vane platforms. The first vane platform has a radially outer face that defines a bearing surface. There is a structural platform adjacent the radially outer face. The structural platform defines a radial seal slot. There is an expansion gap along an interface between the first vane platform and the structural platform that varies with relative movement between the ceramic vane piece and the structural platform such that there is a range of radial and axial motion. A seal has a radial leg and an axial leg. The radial leg extends in the radial seal slot and the axial leg extends in the interface along the bearing surface. A pressure tap opens to the seal. The pressure tap provides a pressurized fluid biasing the seal toward a seated sealing position against the radial seal slot and the bearing surface over the range of radial and axial motion.

In a further embodiment of any of the foregoing embodiments, the axial leg defines an axial length, the radial leg defines a radial length, and the axial length is greater than the radial length.

In a further embodiment of any of the foregoing embodiments, the seal includes a filet that joins the radial leg and the axial leg such that the seal has an L-shaped cross-section.

In a further embodiment of any of the foregoing embodiments, the radial leg extends from the filet to a tip edge, and the tip edge has a concavity.

In a further embodiment of any of the foregoing embodiments, the structural platform defines a purge hole that opens at the radial seal slot and exits over the concavity.

In a further embodiment of any of the foregoing embodiments, the seal is formed of a metallic material and has a thickness of 0.15 millimeters to 0.28 millimeters.

In a further embodiment of any of the foregoing embodiments, the structural platform further comprises an axial seal slot extending from the radial seal slot.

In a further embodiment of any of the foregoing embodiments, the radial leg and the axial leg form an angle of 60° to 105°.

A method for assembling a vane according to an example of the present disclosure includes providing a structural platform that defines a radial seal slot and a ceramic vane piece that defines first and second vane platforms and a hollow airfoil section that joins the first and second vane platforms. A seal is introduced between the structural platform and the first vane platform such that a radial leg of the seal extends in the radial seal slot and an axial leg of the seal extends in an interface between the structural platform and the first vane platform.

In a further embodiment of any of the foregoing embodiments, the axial leg defines an axial length, the radial leg defines a radial length, the axial length is greater than the radial length, and the seal includes a filet that joins the radial leg and the axial leg such that the seal has an L-shaped cross-section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
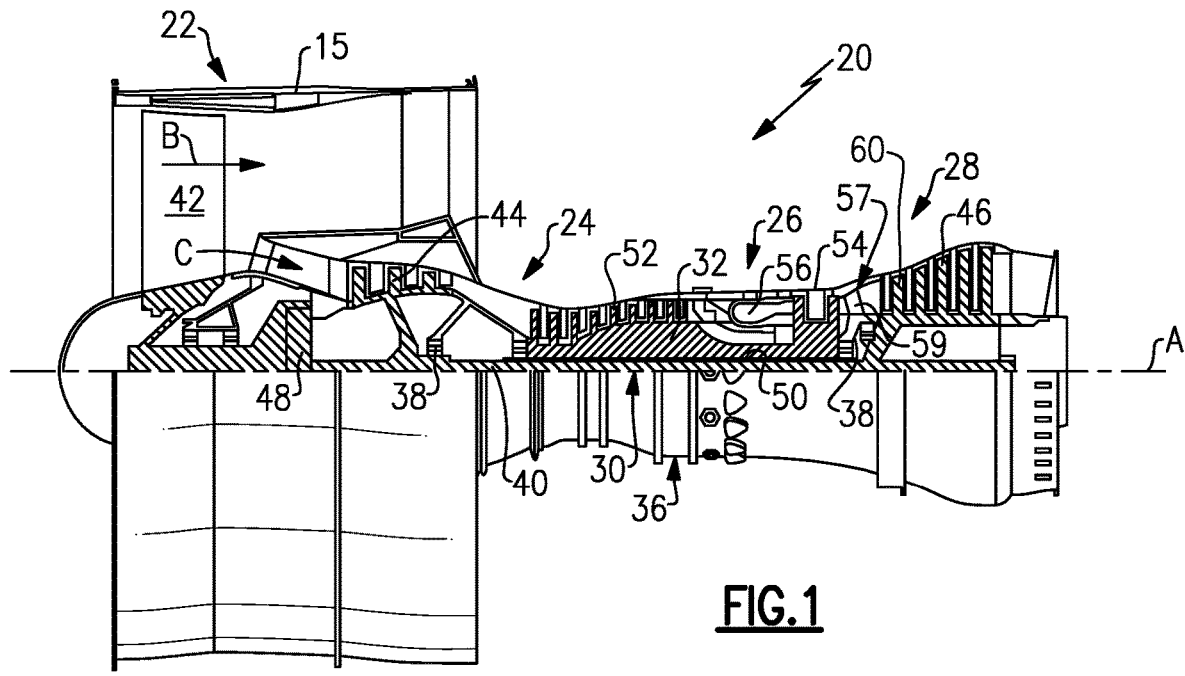
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{\wedge}0.5$. The "Low corrected fan tip speed" as disclosed herein according to one non-limiting embodiment is less than about 1150 ft/second (350.5 meters/second).

Figure 2:
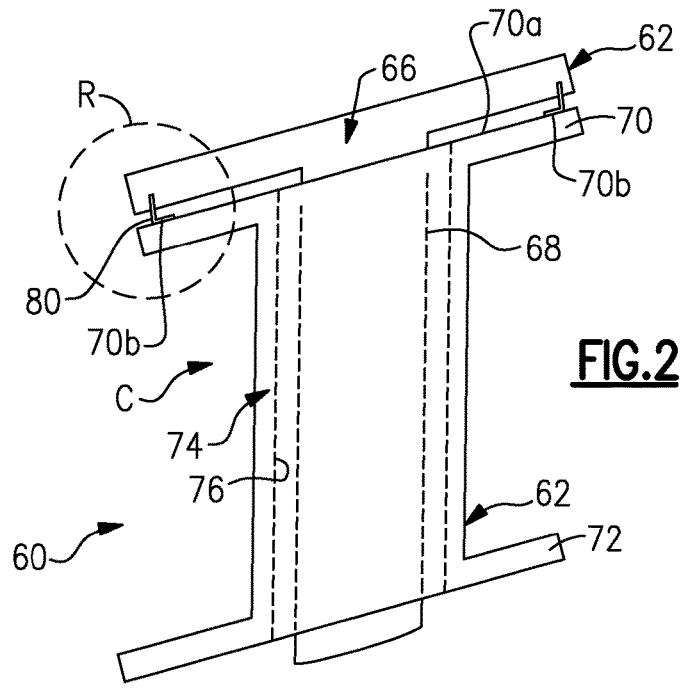
FIG. 2 illustrates an example vane of the gas turbine engine.

FIG. 2 illustrates a schematic view of a representative vane assembly, i.e., vane 60, from the turbine section 28 of the engine 20, although the examples herein may also be applied to vanes in the compressor section 24. A plurality of vanes 60 are situated in a circumferential row about the engine central axis A. The vane 60 is comprised of a ceramic vane piece 62 and a structural platform 64. In the illustrated example, the structural platform 64 is part of a spar piece 66, but the structural platform 64 could alternatively be part of a case or other non-spar structure. The spar piece 66 includes the structural platform 64 and a hollow spar 68 that extends into the ceramic vane piece 62. For example, the spar piece 66 is formed of a metallic material, such as a nickel- or cobalt-based superalloy, and is a single, monolithic piece. The ceramic vane piece 62 and the spar piece 64 may be clamped or otherwise held together in a known manner with a fastener (not shown), such as a tie rod.

The ceramic vane piece 62 includes several sections, including first (radially outer) and second (radially inner) platforms 70/72 and a hollow airfoil section 74 that joins the first and second platforms 70/72. The first platform 70 includes a radially outer face 70a that defines a bearing surface 70b. The airfoil section 74 includes at least one internal passage 76. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The ceramic vane piece 62 is formed of a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC nay be comprised of fiber plies that are arranged in a stacked configuration and formed to the desired geometry of the ceramic vane piece 62. For instance, the fiber plies may be layers or tapes that are laid-up one on top of the other to form the stacked configuration. The fiber plies may be woven or unidirectional, for example. At least a portion of the fiber plies may be continuous through the first platform 70, the airfoil section 74, and the second platform 72. In this regard, the ceramic vane piece 62 may be continuous in that the fiber plies are uninterrupted through the first platform 70, the airfoil section 74, and the second platform 72.

Figure 3:
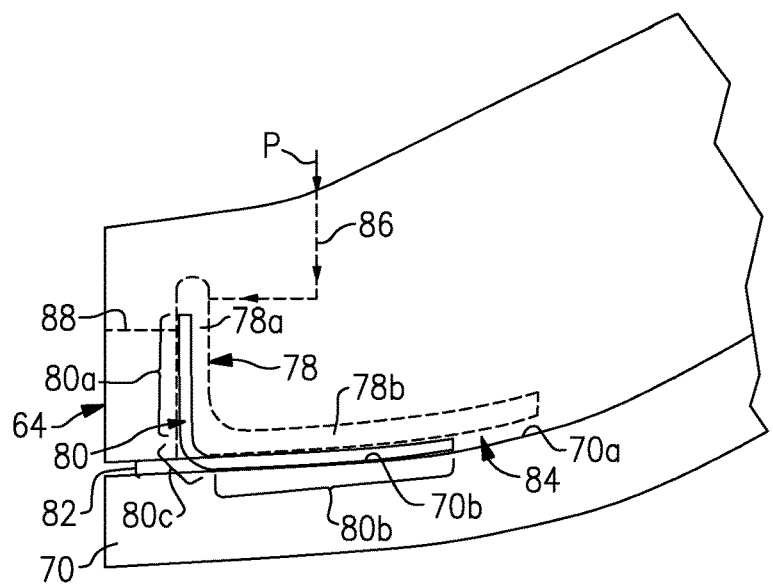
FIG. 3 illustrates a detailed view of a region R identified in FIG. 2.

FIG. 3 illustrates a more detailed view of a region R (indicated in FIG. 2) at the leading end of the platforms 64/70 of the vane 60. It is to be understood that the examples herein may additionally be applied to the trailing end of the platforms 64/70. The structural platform 64 defines a seal slot 78. In this example, the seal slot 78 has a radial seal slot 78a and an axial seal slot 78b that extends from the radial seal slot 78a.

Figure 4:
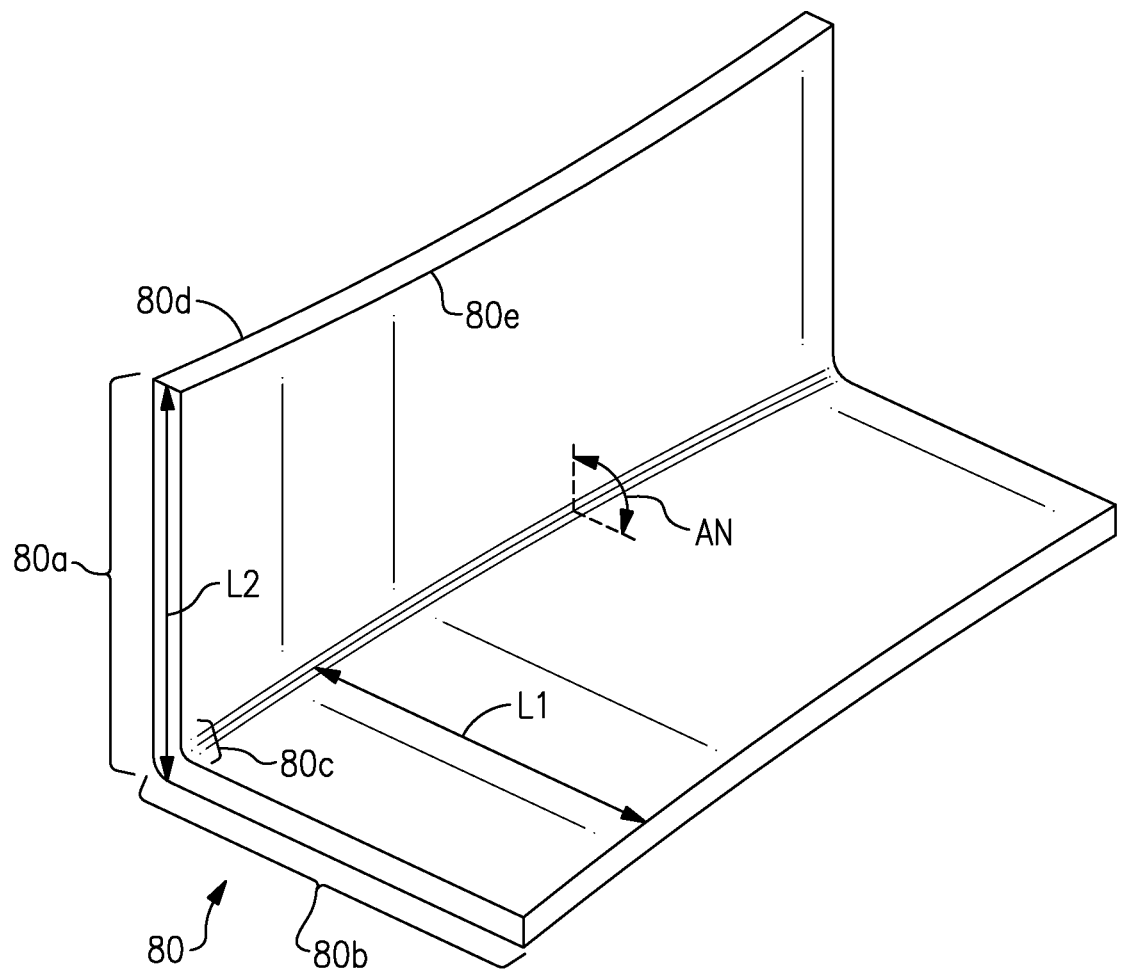
FIG. 4 illustrates an isolated view of a seal.

The vane 60 further includes a seal 80, which is also shown in an isolated view in FIG. 4. The seal 80 is arced (i.e., an arc segment about engine central axis A) and has a radial leg 80a, an axial leg 80b, and a filet 80c that joins the radial and axial legs 80a/80b such that the seal 80 has an L-shaped cross-sectional shape. In one example, the radial leg 80a and the axial leg 80b form an angle (AN) of 60° to 105°.

The radial leg 80a extends in the radial seal slot 78a and the axial leg 80b extends along the axial seal slot 78b in an expansion gap 82 at an interface 84 between the structural platform 64 and the first vane platform 70 (FIG. 3). In this regard, the axial seal slot 78b opens toward the first platform 70 and may be considered to be part of the interface 84. The seal 80 may extend in the circumferential direction the full or substantially full circumferential extent of the first platform 70. In this example, the axial leg 80b defines an axial length (L1), the radial leg defines a radial length (L2), and the axial length (L1) is greater than the radial length (L2). In one example, the lengths L1 and L2 refer to the minimum length along the extent of the radial leg 80a and axial leg 80b, respectively. The radial leg 80a extends from the filet 80c to a tip edge 80d (radial face). As shown, the tip edge 80d may have a concavity 80e in that the circumferential ends of the radial leg 80a have a greater radial length (L2) than the circumferentially central portion of the radial leg 80a.

The vane 60 may further include a pressure tap 86 that opens to the seal 80. For instance, the pressure tap 86 includes one or more passages through the structural platform 64 that open into the seal slot 78, such as to the radial seal slot 78a. Pressurized fluid (P), such as bleed air from the compressor section 24, is provided through the pressure tap 86 and into the seal slot 78. The pressurized fluid provides a back-pressure behind the seal 80 that biases the radial leg 80a of the seal 80 toward a seated sealing position against the side of the radial seal slot 78a and the axial leg 80b against the bearing surface 70b of the first platform 70. The seal 80 may be further configured to conform to the side of the radial seal slot 78a and to the bearing surface 70b. For instance, the seal 80 is formed of a metallic sheet material that is relatively thin to allow the seal 80 to deflect or deform to the local contours of the side of the radial seal slot 78a and the bearing surface 70b. In one example, the walls of the seal 80 have a thickness of 0.15 millimeters to 0.28 millimeters to permit such conformance while also maintaining sufficient stiffness to prevent the radial leg 80a of the seal 80 from folding or "extruding" into the interface 84.

The structural platform 64 may also include one or more purge holes 88 that allow the pressurized fluid to exit from the seal slot 78. For example, the purge hole(s) 88 are axial holes that open to the forward face of the structural platform 64. In the seal slot 78, the purge holes 88 may open at a location that corresponds to the concavity 80e of the radial leg 80a. That is, the concavity 80e is shorter in radial length (L2) so that the radial leg 80a does not obstruct the purge hole(s) 88. As will be appreciated, the concavity 80e may be excluded and a straight edge 80d used instead if the purge holes(s) 88 are excluded or positioned elsewhere.

During operation of the engine 20 cooling air, such as bleed air from the compressor section 24, is provided through the structural platform 64 into the internal passage 76 of the ceramic vane piece 62. The seal 80 serves to facilitate a reduction in air leakage from the internal passage 76 through the interface 84 as well as limit combustion gases from the core flow passage C from infiltrating into the interface 84.

Figure 5A:
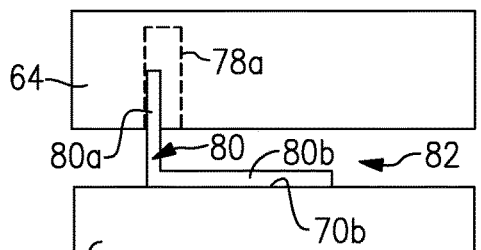
FIGS. 5A, 5B, and 5C illustrate sealing over a range of radial and axial motion between a structural platform and a vane platform.
Figure 5B:
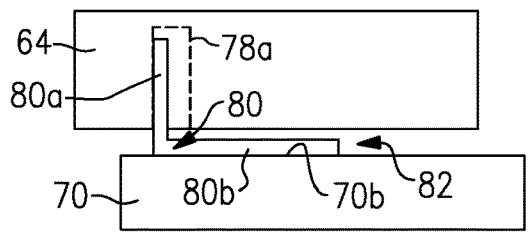
Figure 5C:
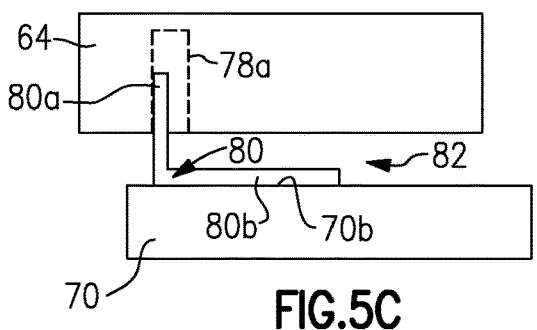

The configuration of the seal 80 facilitates maintaining sealing over a range of relative radial and axial motion between the ceramic vane piece 62 and the structural platform 64. For example, the ceramic vane piece 62 and the structural platform 64 can move radially and axially relative to one another due to differences in thermal expansion/contraction and/or shifting from aerodynamic forces. FIGS. 5A, 5B, and 5C illustrate example relative motions to demonstrate the operation of the seal 80 over a range of motions. In FIG. 5A the gap 82 between the ceramic vane piece 62 and the structural platform 64 is in a maximum expanded state in comparison to the gap shown in FIG. 3. For instance, in the maximum expanded state, the gap 82 may be up to five times greater in size (radial height between the ceramic vane piece 62 and the structural platform 64) than in a default or non-expanded state (FIG. 3). As shown, the radial length of the radial leg 80a is such that at least a portion of the radial leg 80a remains in the radial seal slot 78a in the maximum expanded state so that sealing is maintaining in the maximum expanded state.

In FIG. 5B the ceramic vane piece 62 is axially shifted relative to the structural platform 64 to a maximum axial shift state in comparison to the relative axial position shown in FIG. 3. As shown, the seal 80 remains seated such that the axial leg 80a of the seal 80 maintains sealing with the bearing surface 70b of the first platform 70.

As demonstrated in FIGS. 5A and 5B, the seal 80 maintains sealing over a maximum expanded state and a maximum axial shift state. As can be appreciated, the seal 80 also maintains sealing over intermediate relative positions that are less than the maximum expanded state and less than the maximum axial shift state, as shown in FIG. 5C. Additionally, the axial length (L1) of the axial leg 80b being greater than the radial length (L2) of the radial leg 80a facilitates teetering of the seal 80. For instance, as the ceramic vane piece 62 and the structural platform 64 move relative to one another, the seal 80 may teeter on the axial leg 80a to accommodate the movement, yet maintain contact with the bearing surface 70b for sealing.

Figure 6:
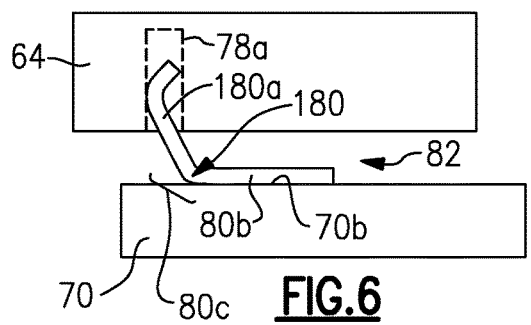
FIG. 6 illustrates another example seal.

FIG. 6 illustrates another example seal 180. The seal 180 is the same as the seal 80 except that radial leg 180a is hooked. For instance, the radial leg 180a is hooked in a retrograde manner, i.e., back toward the axial leg 80b. The curvature of the hook shape of the radial leg 180a enables the seal 180 to maintain a circumferential line of contact with the side of the radial seal slot 78a in the event that the seal 180 tilts axially forward or aft.

As shown and described, the seal 80/180 facilitates sealing in a dynamic location over a range of radial and axial motion. Moreover, unlike simple feather seals or brush seals, the legs 80a/180a/80b of the seal 80/180 provide sealing in two dimensions—axial and radial.

The vane 60 also embodies a method of assembly. For example, the method includes providing the structural platform 64 and the ceramic vane piece 62 with the first platform 70, and then introducing the seal 80/180 between the structural platform 64 and the first platform 70 such that the radial leg 80a/180a of the seal 80/180 extends in the radial seal slot 78a and an axial leg 80b of the seal 80/180 extends in the interface 84 between the structural platform 64 and the first platform 70. As an example, the seal 80/180 may be placed between the structural platform 64 and the first platform 70 prior to bring the structural platform 64 and the first platform 70 together during assembly, i.e., inserting the spar 68 through the internal passage 76. The method may be applied in an original manufacture of the vane 60 and/or as part of a repair or replacement process.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane comprising:
    a ceramic vane piece defining first and second vane platforms and a hollow airfoil section joining the first and second vane platforms;
    a structural platform adjacent the first platform, the structural platform defining a radial seal slot; and
    a seal having a radial leg and an axial leg, the seal including a filet that joins the radial leg and the axial leg such that the seal has an L-shaped cross-section, the radial leg extending in the radial seal slot and the axial leg extending in an interface between the structural platform and the first vane platform, the radial leg extending from the filet to a tip edge, the tip edge having a concavity, and the structural platform defining a purge hole that opens at the radial seal slot and exits over the concavity.

2. The vane as recited in claim 1, further comprising a pressure tap that opens to the seal.

3. The vane as recited in claim 1, wherein the axial leg defines an axial length, the radial leg defines a radial length, and the axial length is greater than the radial length.

4. The vane as recited in claim 1, wherein the radial leg and the axial leg are arced.

5. The vane as recited in claim 1, wherein the seal is formed of a metallic material and has a thickness of 0.15 millimeters to 0.28 millimeters.

6. The vane as recited in claim 1, wherein the structural platform further comprises an axial seal slot extending from the radial seal slot.

7. The vane as recited in claim 1, wherein the radial leg and the axial leg form an angle of 60° to 105°.

8. A vane comprising:
    a ceramic vane piece defining first and second vane platforms and a hollow airfoil section joining the first and second vane platforms, the first vane platform having a radially outer face defining a bearing surface;
    a structural platform adjacent the radially outer face, the structural platform defining a radial seal slot, an expansion gap along an interface between the first vane platform and the structural platform, the expansion gap varying with relative movement between the ceramic vane piece and the structural platform such that there is a range of radial and axial motion;
    a seal having a radial leg and an axial leg, the radial leg extending in the radial seal slot and the axial leg extending in the interface along the bearing surface; and
    a pressure tap opening to the seal, the pressure tap providing a pressurized fluid biasing the seal toward a seated sealing position against the radial seal slot and the bearing surface over the range of radial and axial motion.

9. The vane as recited in claim 8, wherein the axial leg defines an axial length, the radial leg defines a radial length, and the axial length is greater than the radial length.

10. The vane as recited in claim 9, wherein the seal includes a filet that joins the radial leg and the axial leg such that the seal has an L-shaped cross-section.

11. The vane as recited in claim 10, wherein the radial leg extends from the filet to a tip edge, and the tip edge has a concavity.

12. The vane as recited in claim 11, wherein the structural platform defines a purge hole that opens at the radial seal slot and exits over the concavity.

13. The vane as recited in claim 10, wherein the seal is formed of a metallic material and has a thickness of 0.15 millimeters to 0.28 millimeters.

14. The vane as recited in claim 8, wherein the structural platform further comprises an axial seal slot extending from the radial seal slot.

15. The vane as recited in claim 8, wherein the radial leg and the axial leg form an angle of 60° to 105°.

16. A method for assembling a vane, the method comprising:
    providing a structural platform that defines a radial seal slot and a ceramic vane piece that defines first and second vane platforms and a hollow airfoil section that joins the first and second vane platforms; and
    introducing a seal between the structural platform and the first vane platform such that a radial leg of the seal extends in the radial seal slot and an axial leg of the seal extends in an interface between the structural platform and the first vane platform, the seal includes a filet that joins the radial leg and the axial leg such that the seal has an L-shaped cross-section, the radial leg extends from the filet to a tip edge and the tip edge has a concavity, and the structural platform defines a purge hole that opens at the radial seal slot and exits over the concavity.

17. The method as recited in claim 16, wherein the axial leg defines an axial length, the radial leg defines a radial length, the axial length is greater than the radial length, and the seal includes a filet that joins the radial leg and the axial leg such that the seal has an L-shaped cross-section.

* * * * *